(12) United States Patent  
Sakata et al.

(10) Patent No.: US 11,964,562 B2  
(45) Date of Patent: Apr. 23, 2024

(54) OPERATION PANEL

(71) Applicant: DENSO TEN Limited, Kobe (JP)

(72) Inventors: Masataka Sakata, Kobe (JP); Shohei Yoshii, Kobe (JP); Tomoaki Ishikawa, Kobe (JP)

(73) Assignee: DENSO TEN Limited, Kobe (JP)

(*) Notice: Subject to any disclaimer, the term of this patent is extended or adjusted under 35 U.S.C. 154(b) by 462 days.

(21) Appl. No.: 17/376,293

(22) Filed: Jul. 15, 2021

(65) Prior Publication Data

US 2022/0063409 A1  Mar. 3, 2022

(30) Foreign Application Priority Data

Aug. 27, 2020  (JP) .................................. 2020-143824

(51) Int. Cl.
    *B60K 35/10* (2024.01)
    *B60K 35/00* (2006.01)
    *B60K 35/50* (2024.01)
    *B60K 35/65* (2024.01)
    *H04R 1/08* (2006.01)

(52) U.S. Cl.
    CPC .............. *B60K 35/00* (2013.01); *B60K 35/10* (2024.01); *H04R 1/08* (2013.01); *B60K 35/50* (2024.01); *B60K 35/652* (2024.01); *B60K 2360/148* (2024.01); *B60K 2360/682* (2024.01); *B60K 2360/828* (2024.01); *H04R 2499/13* (2013.01)

(58) Field of Classification Search
    CPC .. B60K 35/00; B60K 37/06; B60K 2370/148; B60K 2370/682; B60K 2370/733; B60K 2370/828; B60K 2370/10; B60K 2370/152; B60K 2370/774; B60K 2370/816; H04R 1/08; H04R 2499/13
    See application file for complete search history.

(56) References Cited

U.S. PATENT DOCUMENTS

2009/0295724 A1* 12/2009 Cheng .................... G05G 9/047
                                                    345/161

FOREIGN PATENT DOCUMENTS

| JP | 2005-109830 A | 4/2005 |
| JP | 2014-125043 A | 7/2014 |
| JP | 2015-083413 A | 4/2015 |
| JP | 2017-211882 A | 11/2017 |

* cited by examiner

*Primary Examiner* — Michael C Zarroli  
(74) *Attorney, Agent, or Firm* — Oliff PLC (57) ABSTRACT

An operation panel of an electronic equipment includes a panel body having at least two openings that have identical shapes and sizes, at least one dummy cover having a shape and a size that fits to any of the at least two openings that have identical shapes and sizes, and an electronic component that is mounted on the dummy cover.

5 Claims, 5 Drawing Sheets

OPERATION PANEL

BACKGROUND OF THE INVENTION

Field of the Invention

The invention relates to an operation panel of electronic equipment.

Description of the Background Art

Conventionally, electronic equipment including an operation panel that is provided with an operation portion such as an operation button has been known. For example, the operation panel has a rectangular shape that surrounds an outer periphery of a screen for displaying an image. Examples of the electronic equipment including such an operation panel include a car navigation device, a display audio, and the like. A microphone may be arranged in the operation panel (for example, refer to Japanese Published Unexamined Patent Application No. 2005-109830).

By the way, for the electronic equipment that is mounted on a vehicle, such as a display audio, two types of products may be prepared: one product is for a left-hand drive vehicle and the other product is for a right-hand drive vehicle. For example, one microphone to be arranged in the operation panel is provided on a left side of the product for the left-hand drive vehicle and the other microphone is provided on a right side of the product for the right-hand drive vehicle so that the microphone is close to a driver. A hole for inputting a voice is provided in a position in which the microphone of the operation panel is arranged. As a result, in a conventional technology, different operation panels having different configurations have been required in the product for the left-hand drive vehicle and the product for the right-hand drive vehicle.

Furthermore, when a microphone is arranged on a side of the vehicle, there is no need to provide a microphone on a side of the electronic equipment. A configuration of the operation panel has to be changed between when the microphone is required and when the microphone is not required. Here, although an example of the microphone has been described, even when electronic components other than the microphone are arranged in the operation panel, there has been concerns that the configuration of the operation panel has to be changed between when the electronic components are required and when the electronic components are not required.

When a plurality of types of the operation panels are prepared according to various requirements, for example, design and manufacturing costs of a metal mold may increase. In order to avoid an increase of the costs, the types of the operation panels are limited so that models of the vehicles capable of mounting the operation panels may be limited or unnecessary holes (for examples, sound holes for the microphone) may be kept opened. Unnecessary holes, for example, may cause a deterioration of an appearance of the operation panels and a breakage of components due to intrusion of water into an interior of the operation panels.

SUMMARY OF THE INVENTION

According to one aspect of the invention, an operation panel of an electronic equipment includes a panel body having at least two openings that have identical shapes and sizes, at least one dummy cover having a shape and a size that fits to any of the at least two openings that have identical shapes and sizes, and an electronic component that is mounted on the dummy cover.

It is an object of the invention to provide an operation panel of an electronic equipment capable of flexibly coping with various requirements while suppressing an increase in manufacturing and development costs.

These and other objects, features, aspects and advantages of the invention will become more apparent from the following detailed description of the invention when taken in conjunction with the accompanying drawings.

DESCRIPTION OF THE EMBODIMENTS

Figure 1:
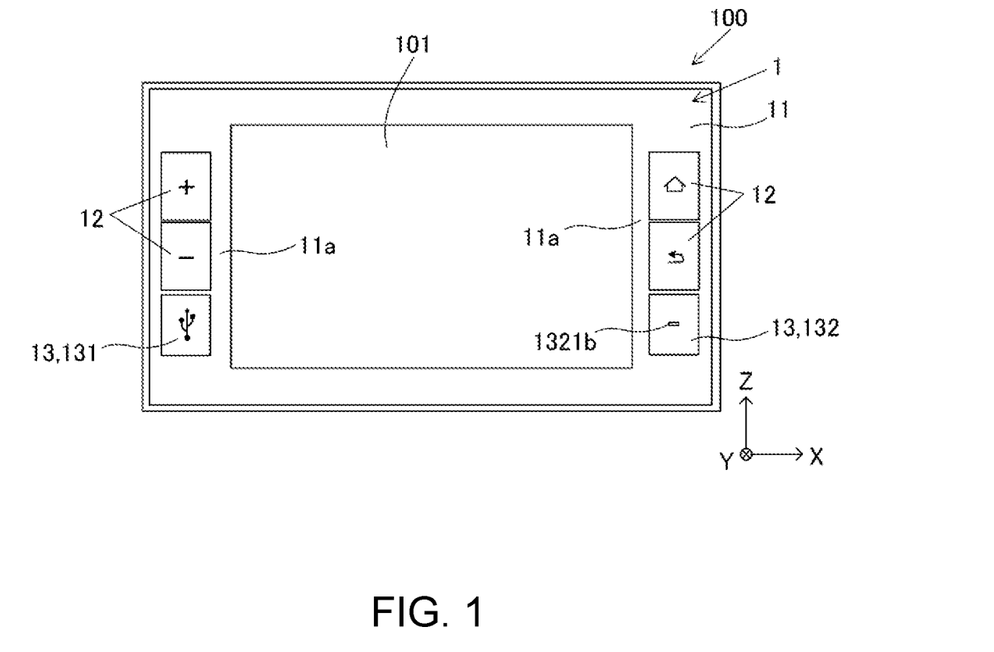
FIG. 1 is a schematic plan view illustrating a configuration of an electronic equipment to which an operation panel is applied.
Figure 3:
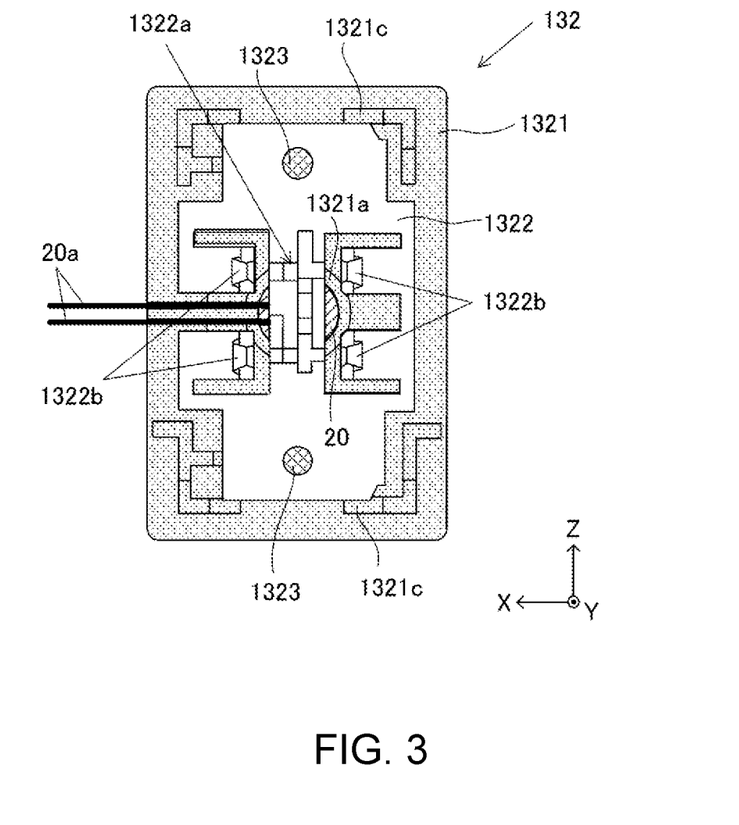
FIG. 3 is a schematic plan view illustrating a configuration of a dummy cover.

Hereinafter, an exemplary embodiment will be described in detail with reference to the accompanying drawings. In the drawings, an XYZ coordinate system is appropriately illustrated as a three-dimensional orthogonal coordinate system. In the XYZ coordinate system, a tip side of an arrow is a positive side. For example, in FIG. 1, a direction from left to right is referred to as a positive X direction, and a direction from bottom to top is referred to as a positive Z direction. In FIG. 1, a positive Y direction is a direction from a front side to a back side of a paper. In FIG. 3, a positive Y direction is a direction from the back side to the front side of the paper. However, these directions are merely used for explanation and do not limit the actual positional relationships and directions.

1. Electronic Equipment

FIG. 1 is a schematic plan view illustrating a configuration of an electronic equipment 100 to which an operation panel 1 according to this embodiment is applied. The electronic equipment 100 according to this embodiment is mounted on a vehicle. That is, the electronic equipment 100 is an in-vehicle electronic equipment. The electronic equipment 100 is, for example, mounted in an appropriate position of a dashboard of the vehicle. The electronic equipment 100 is, for example, arranged in a left-right direction between a driver's seat and a passenger seat of the vehicle.

The electronic equipment to which the operation panel of this invention is applied may be mounted on mobilities other than the vehicle. The electronic equipment to which the operation panel of this invention is applied may be a household or business electronic equipment.

As illustrated in FIG. 1, the electronic equipment 100 has a screen 101 that displays an image. The screen 101 is, for example, configured by a liquid crystal panel or an organic EL panel. In this embodiment, the screen 101 has a rectangular shape in a plan view (specifically, as seen planarly from a negative Y side to the positive Y side). However, the screen 101 may have a shape other than a rectangular shape, and may have, for example, a circular shape, an elliptical shape, or the like. Examples of the electronic equipment 100 may include a display audio or a navigation device.

The operation panel 1 of the electronic equipment 100 is a part on which an element capable of acting on the electronic equipment 100 from outside is arranged. Examples of such an element may include an operation button, an operation knob, an operation lever, a switch, a microphone for voice recognition, an optical sensor, a connector that enables a wired connection to external equipment, and the like. Examples of the connector may include a USB connector, an auxiliary jack, and the like.

2. Operation Panel

The operation panel 1 will be described in detail below.
(2-1. Overall Configuration)

Figure 2:
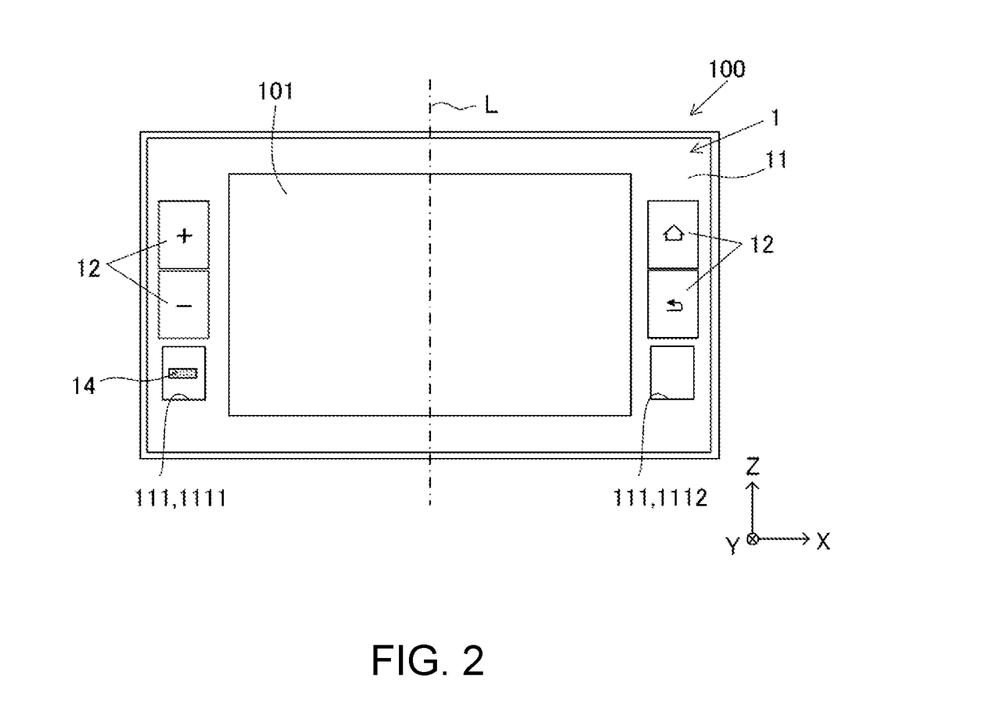
FIG. 2 is a view in which a cover in FIG. 1 has been removed from a panel body.

As illustrated in FIG. 1, the operation panel 1 of the electronic equipment 100 according to this embodiment includes a panel body 11, an operation button 12, and a cover 13. FIG. 2 is a view in which the cover 13 in FIG. 1 has been removed from the panel body 11.

As illustrated in FIG. 1 and FIG. 2, when the screen 101 is seen in a plan view (specifically, as seen planarly from the negative Y side to the positive Y side), the panel body 11 has a frame that surrounds an outer periphery of the screen 101. When the screen 101 is seen planarly from the negative Y side to the positive Y side, the frame may be configured to cover a part of a display panel including the screen 101. Specifically, the frame is a rectangular frame. The panel body 11 is made of a resin or metal, for example.

In two rectangular areas 11a of the rectangular frame that extend in a Z direction, the operation buttons 12 are arranged, respectively. Specifically, in each of the two rectangular areas 11a that extends in the Z direction, two sets of the operation buttons 12 are arranged. When the screen 101 is seen planarly from the negative Y side to the positive Y side, the two sets of the operation buttons 12 that are respectively arranged in the two rectangular areas 11a are preferably arranged symmetrically with respect to a line L bisecting the screen 101 in the X direction. Examples of the operation buttons 12 include a button for adjusting a sound volume, a home button for returning to a home screen, and the like. All or part of the operation buttons 12 do not have to be provided.

As illustrated in FIG. 2, the panel body 11 has at least two openings 111 that have identical shapes. The openings 111 having identical shapes have not only identical shapes but also identical sizes. In this embodiment, a number of the openings 111 having identical shapes is two. The two openings 111 having identical shapes have rectangular shapes when seen planarly from the negative Y side to the positive Y side. The number and shape of the openings 111 having identical shapes may be changed from the configuration of this embodiment.

Specifically, openings for the operation buttons 12 are provided in the panel body 11. The openings for the operation buttons 12 may be included in the openings 111 having identical shapes described above.

In this embodiment, at least one of the openings 111 having identical shapes is a connector opening 1111 from which a connector 14 of the electronic equipment 100 is exposed. Specifically, one of the two openings 111 having identical shapes is the connector opening 1111. In this embodiment, the connector 14 that is exposed from the connector opening 1111 is a USB connector. More specifically, the connector 14 is a Type A USB connector. The connector 14 does not have to be a USB connector. Even when the connector 14 is a USB connector, the connector may be a USB connector other than the Type A USB connector.

In this embodiment, out of the two openings 111 having identical shapes, an opening 1112 that is not the connector opening 1111 is not an opening provided for exposing some sort of elements existing inside the electronic equipment 100 to an outside of the electronic equipment 100. The opening 1112 that is not the connector opening 1111 is an auxiliary opening. The opening 1112 that is not the connector opening 1111 is, for example, provided to cope with a positional change of the connector 14 of the electronic equipment 100 depending on whether a steering wheel of the vehicle is provided on a left or right side of the vehicle. The opening 1112 that is not the connector opening 1111 is hereinafter referred to as an auxiliary opening 1112.

The auxiliary opening 1112 is unnecessary in a sense that an interior of the electronic equipment 100 is exposed. As a result, in this embodiment, a dummy cover 132 is used so that the auxiliary opening 1112 is not seen. The dummy cover 132 fits to any one of the openings 111 having identical shapes from its purpose. When there is a plurality of the auxiliary openings 1112, the dummy cover 132 is used for each of the plurality of the auxiliary openings 1112. That is, the operation panel 1 includes at least one dummy cover 132 that fits to any one of the openings 111 having identical shapes.

In this embodiment, a number of the dummy covers 132 is one. The dummy cover 132 may be formed of the same material as, or different material from the panel body 11. The dummy cover 132 is preferably formed of a resin. The dummy cover 132 is, for example, formed of a PC/ABS alloy, and the like.

In this embodiment, the operation panel 1 includes a connector cover 131 that is fitted into the connector opening 1111. As a result, when the connector 14 of the electronic equipment 100 is not used, it is possible to protect the connector 14. In a preferred embodiment, the connector cover 131 is formed of a different material from the dummy cover 132. The connector cover 131 and the dummy cover 132 are provided for different purposes from each other. Thus, it is possible to allow each of the connector cover 131 and the dummy cover 132 to perform an appropriate function by forming the connector cover 131 and the dummy cover 132 with different materials.

In this embodiment, the connector cover 131 is formed of a flexible material so as to be easily attached to and detached from the panel body 11. The connector cover 131 is, for example, formed of a rubber material. On the other hand, since the dummy cover 132 is not basically assumed to be attached and detached by an occupant, the dummy cover 132 is preferably formed of a harder material than the connector cover 131. In some cases, the connector cover 131 and the dummy cover 132 may be formed of the same material.

An electronic component 20 (refer to FIG. 3 described later) is mounted on the dummy cover 132. That is, the operation panel 1 includes the electronic component 20 to be mounted on the dummy cover 132. With such a configuration, it is possible to place the dummy cover 132 on which the electronic component 20 is mounted over any one of a plurality of the openings 111 having identical shapes. Thus, it is possible to easily change a mounting position of the electronic component 20 without changing a configuration of the panel body 11. That is, it is possible to provide the operation panel 1 of the electronic equipment 100 that flexibly copes with various requirements while suppressing an increase in manufacturing and development costs.

The dummy cover 132 on which the electronic component 20 is mounted is fitted into the opening (auxiliary opening) 1112 that is not the connector opening 1111. With such a configuration, it is possible to easily mount the electronic component 20 in the opening from which the connector 14 is not exposed. Since a configuration required to mount the electronic component 20 may be provided not on the panel body 11 but on the dummy cover 132, it is possible to reduce development costs and shorten development period.

In the above, although one of the plurality of the openings 111 having identical shapes is the connector opening 1111, the electronic equipment 100 does not necessarily have to include the connector 14, and the connector opening 1111 does not have to be provided. In this case, the connector cover 131 that is fitted into the connector opening 1111 is unnecessary and the dummy cover 132 may be mounted over this part. The dummy cover 132 on which the electronic component 20 is not mounted may have the same or different configuration as the dummy cover 132 on which the electronic component 20 is mounted.

In this embodiment, when the screen 101 is seen in the plan view, the panel body 11 includes a pair of the at least two openings 111 that is arranged symmetrically with respect to the line L bisecting the screen 101. Specifically, the screen 101 is seen planarly from the negative Y side to the positive Y side. The line L bisecting the screen 101 is a bisector bisecting the screen 101 in the X direction. The pair of the openings 111 is arranged symmetrically with respect to the bisector L.

Specifically, the pair of the openings 111 includes the connector opening 1111 and the auxiliary opening 1112. For example, it is assumed that the X direction is a horizontal direction in the vehicle on which the electronic equipment 100 is mounted. In such a configuration, it is possible to mount the electronic equipment 100 on both a right-hand drive vehicle and a left-hand drive vehicle without changing a shape of the panel body 11. That is, in such a configuration, it is possible to minimize a design change between the electronic equipment 100 to be mounted on the right- hand drive vehicle and the electronic equipment 100 to be mounted on the left- hand drive vehicle.

In this embodiment, the electronic component 20 to be mounted on the dummy cover 132 is a microphone. For example, a microphone 20 may be mounted on a side of the vehicle. In such a case, a setting of the microphone 20 is unnecessary on a side of the electronic equipment 100. When using the operation panel 1 according to this embodiment, if the microphone 20 is necessary, the dummy cover 132 on which the microphone 20 is mounted may be fitted into the auxiliary opening 1112, and if the microphone 20 is unnecessary, the dummy cover 132 on which the microphone 20 is not mounted may be fitted into the auxiliary opening 1112. That is, it is not necessary to determine whether or not to provide a hole for inputting a voice according to whether the microphone 20 is necessary or unnecessary. Thus, it is possible to suppress the manufacturing and development costs. The dummy cover 132 on which the microphone 20 is not mounted may not include a sound hole. As a result, it is possible to prevent a deterioration of an appearance of the operation panel 1 and intrusion of water through the sound hole.

For example, in order to ensure a sound receiving performance, in the right-hand drive vehicle, the microphone 20 is preferably provided on a right side of the electronic equipment 100, and in the left-hand drive vehicle, the microphone 20 is preferably provided on a left side of the electronic equipment 100. Here, in the horizontal direction, it is assumed that the electronic equipment 100 is arranged between the driver's seat and the passenger seat. When using the operation panel 1 according to this embodiment, without changing the configuration of the panel body 11, by changing a position of the dummy cover 132 on which the microphone 20 is mounted, it is possible to provide the microphone 20 in an appropriate position. In the configuration described above, the operation panel 1 illustrated in FIG. 1 is suitable for the right-hand drive vehicle.

The electronic component 20 to be mounted on the dummy cover 132 may be other electronic components other than the microphone. Examples of the electronic component 20 may include a switch, an AUX jack, a small USB connector such as a type C, and the like. Examples of the switch may include a switch for starting a sound recognition, a switch for a light that lights up the connector 14 when the connector cover 131 is removed from the connector opening 1111, and the like.

(2-2. Specific Example of Dummy Cover)

Figure 4:
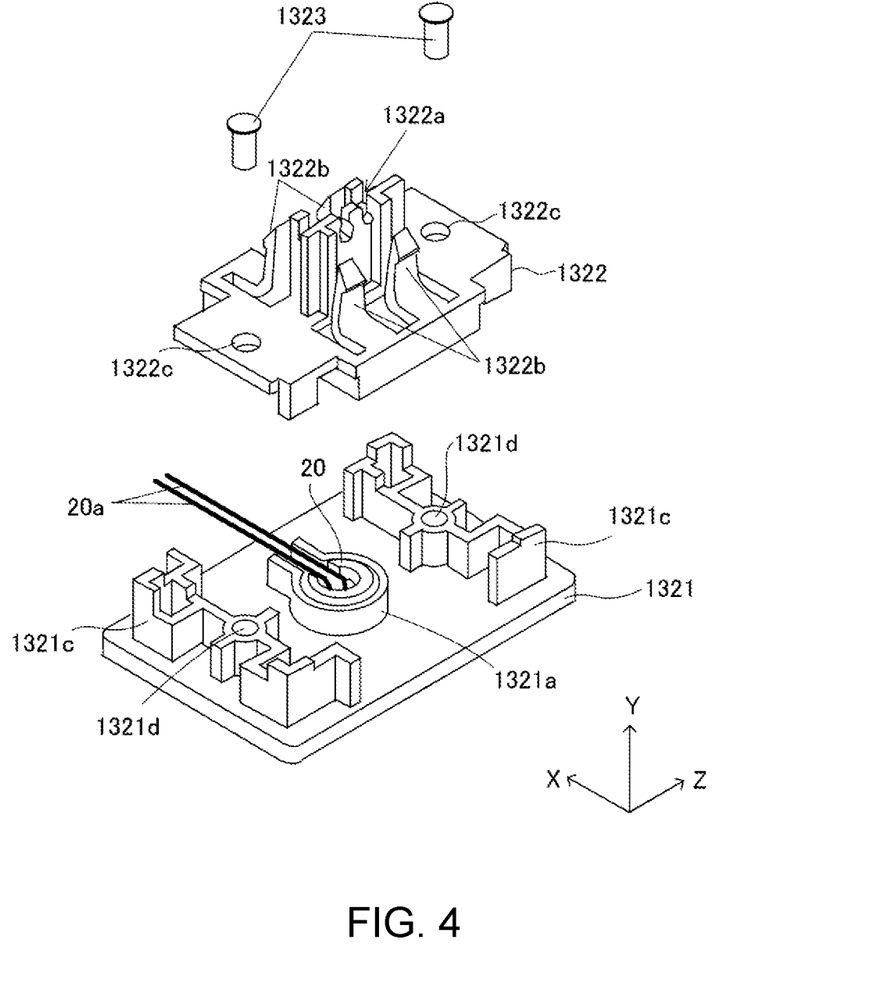
FIG. 4 is a schematically exploded perspective view illustrating the configuration of the dummy cover.

Next, a specific example of a configuration of the dummy cover 132 on which the microphone 20 is mounted will be described. FIG. 3 is a schematic plan view illustrating the configuration of the dummy cover 132 according to this embodiment. FIG. 4 is a schematically exploded perspective view illustrating the configuration of the dummy cover 132 according to this embodiment. FIG. 3 is a view of the dummy cover 132 viewed from the positive Y side to the negative Y side. As illustrated in FIG. 3 and FIG. 4, the dummy cover 132 includes a first member 1321 and a second member 1322.

In this embodiment, the dummy cover 132 is formed by combining two members including the first member 1321 and the second member 1322, but the dummy cover 132 may be formed by only one member or may be formed by three or more members.

The microphone 20 is arranged in the first member 1321. The first member 1321 has a rectangular shape in a plan view seen from the Y direction. At a center of a surface of the first member 1321 on the positive Y side, a microphone arrangement portion 1321a having a cylindrical portion extending to the positive Y side is provided. A lead wire 20a extending from the microphone 20 fitted into the cylindrical portion of the microphone arrangement portion 1321a is drawn from a notch that is provided at a part of the cylindrical portion to an outside of the cylindrical portion.

A sound hole 1321b through which sound can be input to the microphone 20 (refer to FIG. 1) is provided in the first member 1321. The sound hole 1321b is arranged at the center of the first member 1321 and passes through the first member 1321 in the Y direction. The sound hole 1321b faces the microphone 20 to be arranged in the microphone arrangement portion 1321a in the Y direction.

At both ends in a Z direction of the surface of the first member 1321 on the positive Y side, a support base 1321c protruding to the positive Y side is provided. The support base 1321c supports the second member 1322 that is arranged on the positive Y side with respect to the first member 1321. A screw hole 1321*d* into which a screw 1323 for securing the second member 1322 to the first member 1321 is inserted is provided.

The second member 1322 is paired with the first member 1321 so as to sandwich the microphone 20. A part of a surface of the second member 1322 on the negative Y side preferably contacts with at least one of the microphone 20 and the microphone arrangement portion 1321*a*. In such a configuration, it is possible to firmly secure the microphone. The first member 1321 and the second member 1322 may be formed of the same material or different material.

The second member 1322 has a guide structure 1322*a* that guides the lead wire 20*a* extending out from the microphone 20. In such a configuration, it is possible to secure at least a part of the lead wire 20*a* in the dummy cover 132 on which the microphone 20 is mounted and facilitate a process of the lead wire 20*a*. Specifically, the guide structure 1322*a* is provided at a center of a surface of the second member 1322 on the positive Y side. The guide structure 1322*a* is provided with irregularities on a protrusion that protrudes to the positive Y side.

The second member 1322 is provided with an engaging portion 1322*b* to engage the dummy cover 132 with the panel body 11. The engaging portion 1322*b* extends from the surface of the second member 1322 on the positive Y side to the positive Y side and has a hook at an end thereof. The dummy cover 132 uses the engaging portion 1322*b* that is elastically deformed when mounting the dummy cover 132 to the panel body 11 so as to be mounted to the panel body 11. Specifically, two sets of the engaging portion 1322*b* are arranged on the positive X side and negative X side of the guide structure 1322*a*, respectively. However, a position and number of the engaging portion 1322*b* may be appropriately changed.

Apart from that, in the second member 1322, a through hole 1322*c* passing through in the Y direction is provided at each of both ends in the Z direction. The through hole 1322*c* is a hole for passing the screw 1323 for securing the second member 1322 to the first member 1321.

(2-3. Mounting Example of Dummy Cover)

Figure 5:
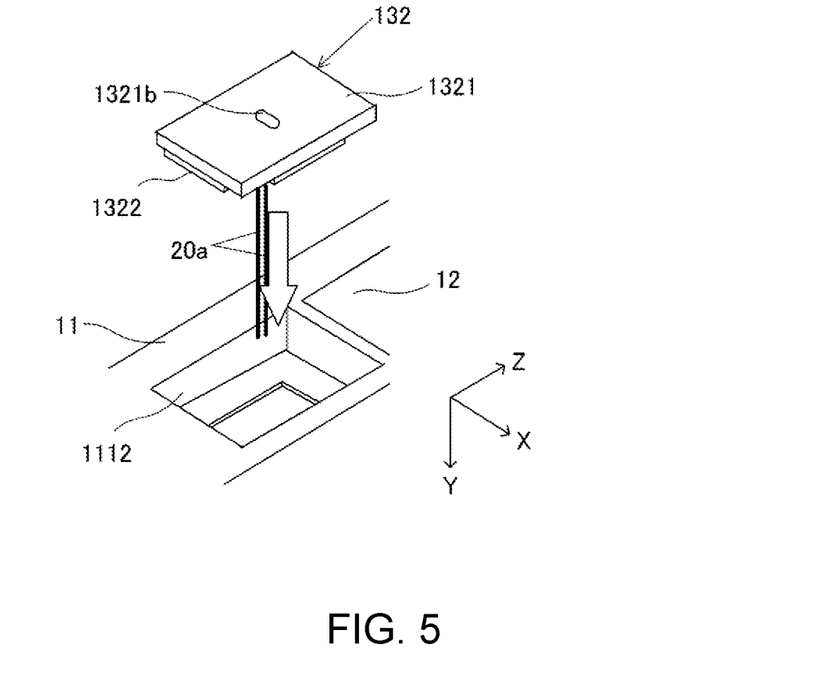
FIG. 5 is a schematic view for explaining an example of an attachment procedure of the dummy cover to the panel body.

FIG. 5 is a schematic view for explaining an attachment procedure of the dummy cover 132 to the panel body 11. In order to attach the dummy cover 132 to the panel body 11, first, the dummy cover 132 in a state (corresponding to the state of FIG. 3) in which the microphone 20 is sandwiched between the first member 1321 and the second member 1322 is prepared.

As illustrated in FIG. 5, the dummy cover 132 assembled as described above is fitted into the auxiliary opening 1112 of the panel body 11 from the negative Y side. The auxiliary opening 1112 passes through the panel body 11 in the Y direction. The auxiliary opening 1112 has a shape in which an opening area at one end on the positive Y side is smaller than an opening area at the other end on the negative Y side. The dummy cover 132 is fitted into the auxiliary opening 1112 so that the engaging portion 1322*b* (refer to FIG. 3 and FIG. 4) is engaged with the panel body 11 at the end of the auxiliary opening 1112 on the positive Y side. As a result, the dummy cover 132 is fixed to the panel body 11. When the dummy cover 132 is fitted into the auxiliary opening 1112, the lead wire 20*a* of the microphone 20 extends out from the end of the auxiliary opening 1112 on the positive Y side to the positive Y side.

Figure 6:
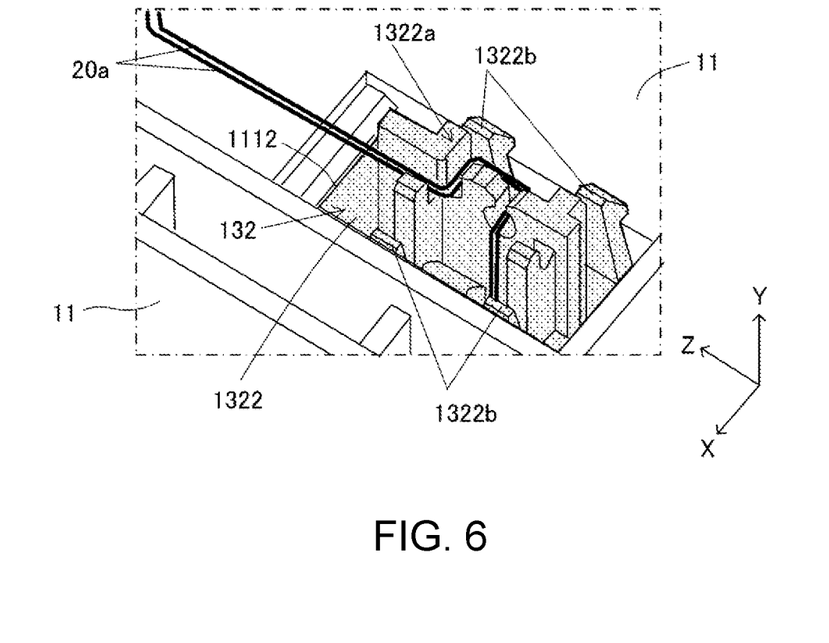
FIG. 6 is a schematic view for explaining a process example of a lead wire of a microphone in the dummy cover attached to the panel body.

FIG. 6 is a schematic view for explaining a process example of the lead wire 20*a* of the microphone 20 in the dummy cover 132 attached to the panel body 11. As illustrated in FIG. 6, in a state in which the dummy cover 132 is fitted into the auxiliary opening 1112, the guide structure 1322*a* protrudes from the end of the auxiliary opening 1112 on the positive Y side to the positive Y side. The lead wire 20*a* of the microphone 20 is wired along a structure of the guide structure 1322*a* and fixed to the second member 1322.

Figure 7:
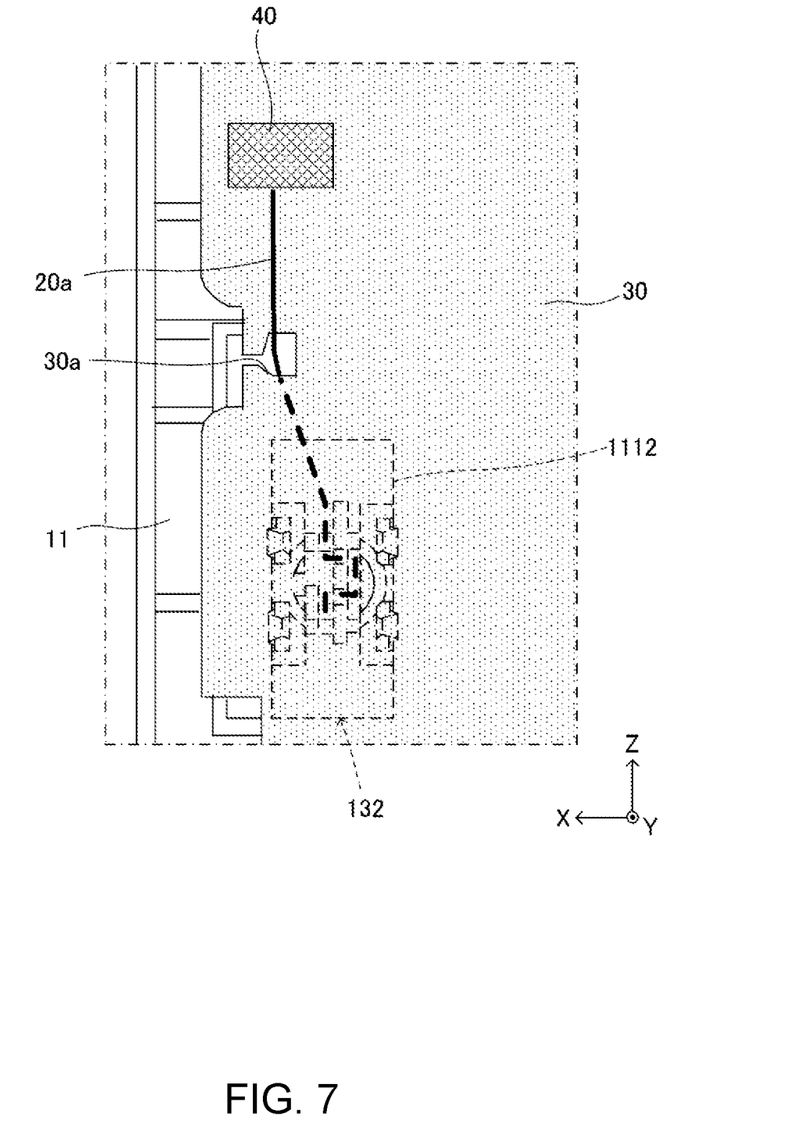
FIG. 7 is a schematic view for explaining the process example of the lead wire of the microphone that extends from the dummy cover.

FIG. 7 is a schematic view for explaining the process example of the lead wire 20*a* of the microphone 20 that extends out from the dummy cover 132. As illustrated in FIG. 7, when the process of the lead wire 20*a* in the dummy cover 132 has completed, a circuit board 30 that is arranged further on the positive Y side than the dummy cover 132 is mounted on the panel body 11. That is, the dummy cover 132 is covered with the circuit board 30.

The circuit board 30 is, for example, provided with a power supply circuit of the electronic equipment 100, a communication circuit of the electronic equipment 100, and the like. Furthermore, a connector 40 for the microphone to be connected to a distal end of the lead wire 20*a* of the microphone 20 is mounted on the surface of the circuit board 30 on the positive Y side.

As illustrated in FIG. 7, a notch 30*a* that is recessed in a negative X direction is provided at an end of the circuit board 30 on the positive X side. The lead wire 20*a* of the microphone 20 that extends out from the dummy cover 132 extends from the negative Y side to the positive Y side of the circuit board 30 via the notch 30*a* and is connected to the connector 40 for the microphone. A through hole passing through the circuit board 30 in the Y direction may be used instead of the notch 30*a*. However, the notch 30*a* is preferably used because the notch 30*a* facilitates a wiring process.

3. Points of Attention

In addition to the foregoing embodiments and modifications, various technological features disclosed in this specification can be changed without departing from the spirit of the technical invention. In other words, the foregoing embodiments and modifications are examples in every aspect, and do not intend to limit the invention. The scope of the invention will be defined by the scope of claims, not by the description in the foregoing embodiments and modifications. The scope of the claims should include the scope of claims, equivalents thereof and all changes within the scope. Features of the above-described preferred embodiments and the modifications thereof may be combined appropriately as long as no conflict arises.

While the invention has been shown and described in detail, the foregoing description is in all aspects illustrative and not restrictive. It is therefore understood that numerous other modifications and variations can be devised without departing from the scope of the invention.

What is claimed is:

1. An operation panel of an electronic equipment, the operation panel comprising:
   a panel body having at least two openings that have identical shapes and sizes;
   at least one dummy cover having a shape and a size that fits to any of the at least two openings that have the identical shapes and sizes;
   a connector cover that is formed of a different material from the dummy cover; and
   an electronic component that is mounted on the dummy cover, wherein
   one of the at least two openings is a connector opening from which a connector of the electronic equipment is exposed, the connector cover is fitted into the connector opening, and the dummy cover on which the electronic component is mounted is fitted into one of the at least two openings other than the connector opening.

2. The operation panel according to claim 1, wherein the electronic component mounted on the dummy cover is a microphone.

3. An operation panel of an electronic equipment, the operation panel comprising:
- a panel body having at least two opening that have identical shapes and sizes;
- at least one dummy cover having a shape and a size that fits to any of the at least two openings that have the identical shapes and sizes; and
- an electronic component that is mounted on the dummy cover, wherein
- the electronic equipment has a screen that displays an image, and when the screen is seen in a plan view, the panel body has a frame that surrounds an outer periphery of the screen, the frame including a pair of the at least two openings, the pair of openings arranged symmetrically with respect to a line bisecting the screen.

4. An operation panel of an electronic equipment, the operation panel comprising:
- a panel body having at least two openings that have identical shapes and sizes;
- at least one dummy cover having a shape and a size that fits to any of the at least two openings that have the identical shapes and sizes; and
- an electronic component that is mounted on the dummy cover, wherein
- the electronic component mounted on the dummy cover is a microphone, and
- the dummy cover includes a first member in which the microphone is arranged and a sound hole through which sound can be input to the microphone, and a second member that is paired with the first member so as to sandwich the microphone between the first and second members.

5. The operation panel according to claim 4, wherein the second member has a guide structure that guides a lead wire that extends out from the microphone.

* * * * *